(No Model.) 2 Sheets—Sheet 1.

J. J. CASEY.
VEHICLE RUNNING GEAR.

No. 602,655. Patented Apr. 19, 1898.

Witnesses:
J. D. Garfield
H. J. Clemons

Inventor,
James J. Casey,
by Champion & Co.
Attorneys.

(No Model.) 2 Sheets—Sheet 2.

J. J. CASEY.
VEHICLE RUNNING GEAR.

No. 602,655. Patented Apr. 19, 1898.

Witnesses:
J. D. Gorfield
K. J. Clemons

Inventor,
James J. Casey,
by Chapin & Co.
Attorneys.

UNITED STATES PATENT OFFICE.

JAMES J. CASEY, OF HOLYOKE, MASSACHUSETTS.

VEHICLE RUNNING-GEAR.

SPECIFICATION forming part of Letters Patent No. 602,655, dated April 19, 1898.

Application filed December 30, 1897. Serial No. 664,652. (No model.)

*To all whom it may concern:*

Be it known that I, JAMES J. CASEY, a citizen of the United States of America, residing at Holyoke, in the county of Hampden and State of Massachusetts, have invented new and useful Improvements in Running-Gear for Vehicles, of which the following is a specification.

This invention relates to vehicle constructions, and especially to the construction of running-gear for vehicles of that class in which the bodies thereof between the front and rear axles extend downward toward the ground, the floor-level of the front and rear ends of said bodies being considerably above that of the portion between said axles, which are located under said raised ends of the body.

The object of the invention is the construction of running-gear for the forward axle of a vehicle of the class described whereby short turns may be made and direct draft from the axle obtained from a proper point on the body of the wagon and in means for so supporting the axle in its proper position that it will not be subjected to undue strain on rough roads and will not by the vertical movement of the wagon-body relative to said axle be forced laterally out of line.

The invention consists in the construction as hereinafter fully described, and pointed out in the claims.

Figure 1:
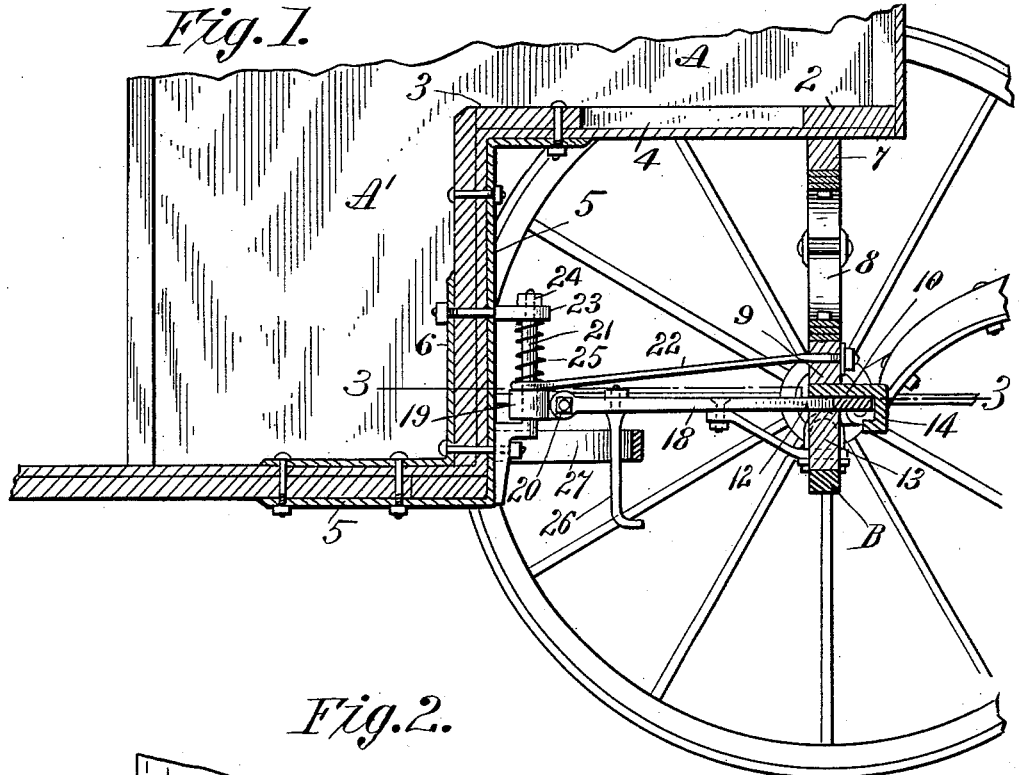
Figure 2:
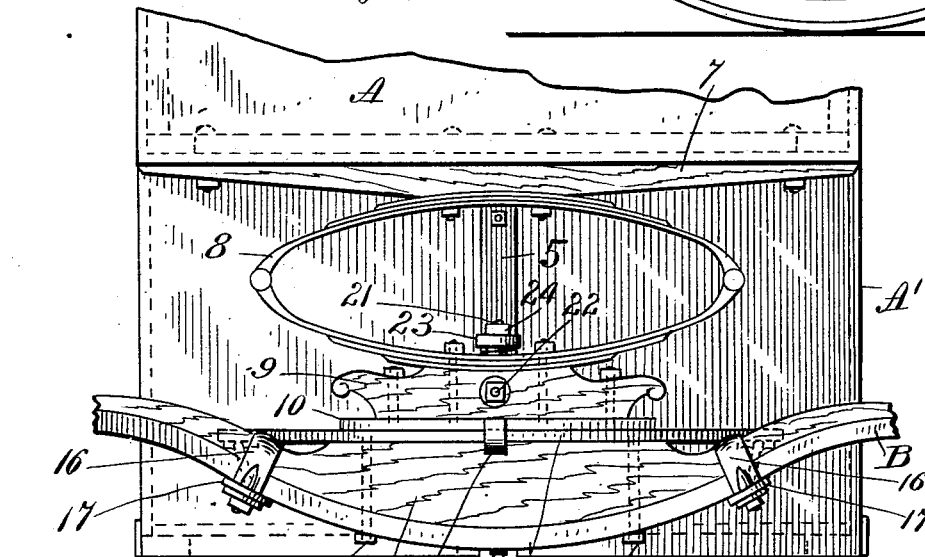
Figure 3:
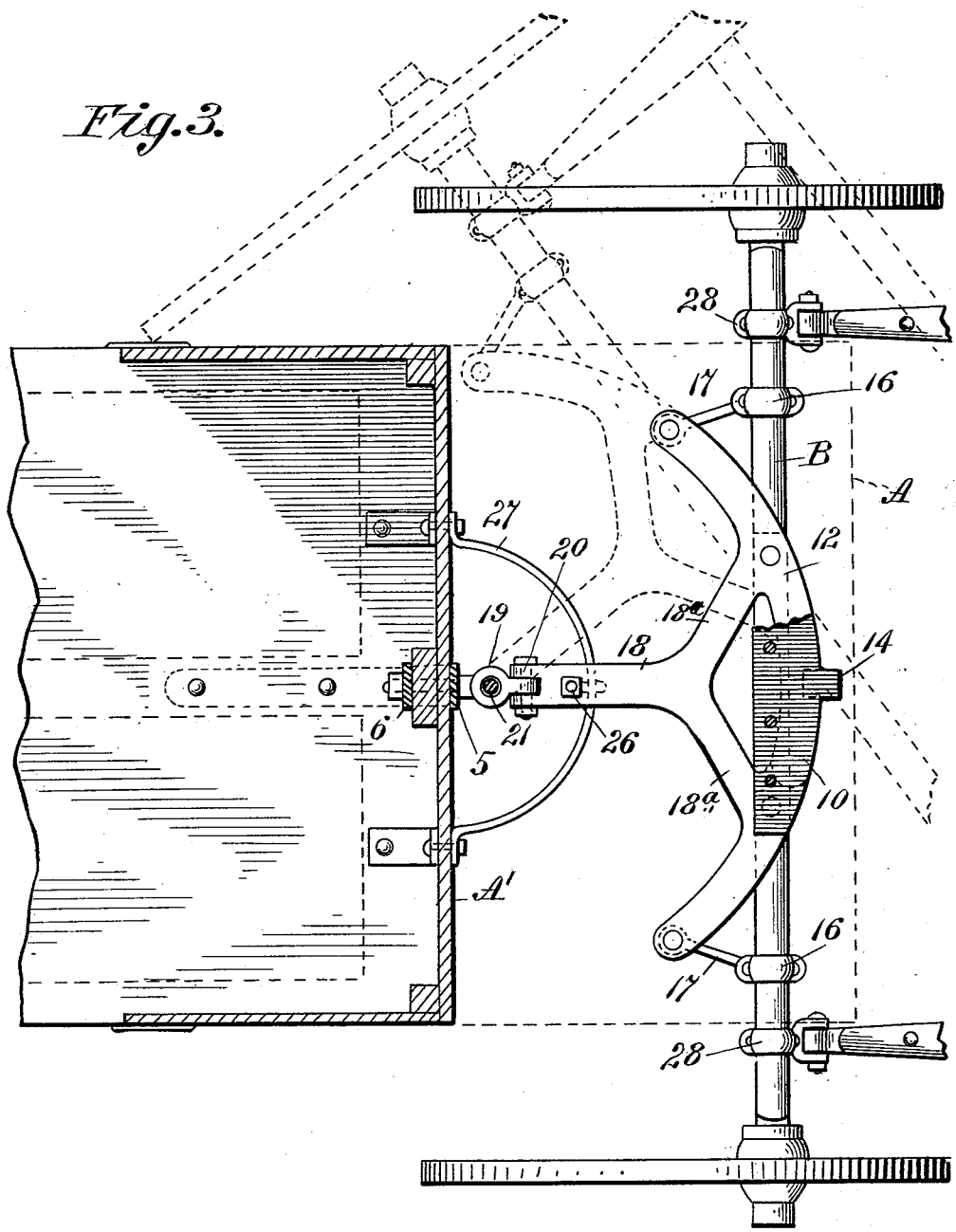

In the drawings forming part of this specification, Figure 1 is a vertical section of a wagon-body of the class described and the running-gear for the front axle constructed according to my invention. Fig. 2 is a front elevation of the same with ends of the axle broken off. Fig. 3 is a sectional plan view of the running-gear and part of the body, taken on line 3 3, Fig. 1.

Referring to the drawings, A is the body of the wagon, having the drop-down portion A' between the front and rear axles. Said front axle is indicated by B.

The forward end only of the body A of the wagon is shown in the drawings, and the floor in that part thereof is suitably reinforced by the front sill 2, the back sill 3, and side sills 4, and the forward end of the drop-down part A' is provided with the iron strap-brace 5 on the outside wall and with the strap-brace 6 on the inside wall of said drop-down portion A', which braces are suitably bolted together and to said wall, as shown, a stiffening-strip, of wood, being interposed between said inside brace 6 and said wall and extending from the floor of the said drop-down portion to the edge of the forward overhanging part of the body.

Secured to the under side of the wagon-body A, near its forward extremity, is the spring-bar 7, of wood, firmly bolted to the front sill 2, and to said spring-bar is bolted a spring 8, preferably of the usual elliptic form and whose opposite side is bolted to the head-block 9, and to the under side of said block is secured the segment-shaped plate 10, which bears on a similarly-shaped though longer plate 12, secured to the upper side of the axle-head 13. On the forward edge of said plate 10, midway between its extremities, a part 14 thereof is turned down and under the edge of the plate 12, which projects beyond the axle-head. In Fig. 2 this part of the construction is clearly shown in section, and in Fig. 3 a part of said plate 10 is shown in plan view in its position on said plate 12 when the axle B is parallel with the end of the drop-down portion A'. Said axle is secured to the axle-head 13 by bolts 13$^a$, which also serve to secure the plate 12 to said head, and by the clips 16, which also serve to secure the ends of the brace-rods 17, which extend from the ends of the plate 12 downward and forward to the under side of the axle for engagement with said said clips 16, as stated. By this method the said ends of the plate 12 are so supported that though their ends extend backward quite a distance they are firmly supported by said braces 17, and a stable platform is thus provided on which the weight of the forward end of the wagon-body A is supported, with the axle B, in either one of the positions shown in dotted or in full lines of Fig. 3.

It is of course obvious that the part 14 of the plate 10 which hooks under the edge of the plate 12 may, if preferred, be made of a piece of metal separate from said plate and bolted to said plate; but the construction shown is preferred. The said plate 12 and the reach 18 may, if desired, be made in one piece, as shown in Fig. 3, or the said reach may, with its arms 18$^a$, be made of a separate piece from the plate 12 and be secured thereto in any suitable manner. However, the construction shown in the accompanying drawings is the preferred construction. The rear end of said reach 18 is pivotally connected to a collar 19 by a pin 20, which passes through a lug on said collar, which enters a slot in the end of said reach. Said collar 19 has a free sliding movement vertically on a king-bolt 21, which is supported in a vertical position on the end of the drop-down portion A' of said wagon-body and on the longitudinally-central line thereof. The location vertically of said king-bolt is such that the normal position of the collar 19 is at or near the lower end thereof. A brace-rod 22, one end of which is bolted to the head-block 9, is provided at its opposite end with an eye through which said king-bolt passes, and by means of this brace the proper operative relation of the plates 10 and 12 is assured. The said king-bolt is made with a part thereof bolted directly to the drop-down portion A', and its upper end passes through an eyebolt 23, also secured to said drop-down part, and a nut 24 is applied to the threaded upper end of said king-bolt, which projects above the eyebolt, binding the latter securely in its place.

A spiral spring 25 is located on the king-bolt, as shown, one end bearing on the under side of the eyebolt 23 and the opposite end on the top of the eye of the brace-rod 22. The function of this spring is to prevent a too violent vertical movement of the collar 19 on said king-bolt if the wagon should pass over a rough road.

To provide against danger resulting from the breaking of the king-bolt from any cause, a safety-hook 26 is secured to the under side of the reach 18 and is provided with a hooked lower end, as shown. Said hook normally lies within a loop 27, of metal, secured by its ends to the drop-down portion A' of the wagon, as shown in Fig. 3, and is of substantially semicircular form, its center coinciding substantially with the centers of the curved plates 10 and 12, which permits said hook 26 to swing freely from side to side by the turning of the axle and yet always maintains its position relative to the loop 27 in whichever angular position the axle might occupy relative to the longitudinal center of the wagon-body. Said hook would always engage said loop should the king-bolt break and the forward end of the wagon be thereby prevented from dropping to the ground.

The axle B is preferably made of the curved form shown in Fig. 2 of the drawings, whereby the ends of said axle receiving the hubs of the wheels will lie in the same horizontal plane as that in which the plates 10 and 12 swing and whereby the swing of the axle from side to side, as in turning, will be more free than if the centers of said hubs were either below or above the plane indicated, and, furthermore, it permits the application of the thill-coupling 28 to said axle in a position which brings the line of draft in the same plane with the plates 10 and 12 and said reach 18.

The said reach always maintains its right-angular relation to the axle, and therefore as the latter moves vertically, following the movements imparted to it by the compression and expansion of the spring 8, said reach moves with it, and the collar 19, to which the reach is secured, is thus given a vertical movement on the king-bolt. It is thus apparent that however much the spring 8 may be compressed the line of draft will always be in a straight line back from the axle to the wagon-body.

The pivotal connection between the end of the reach and the collar 19, while it obviates rigidity of movement, might be omitted and said reach and collar be made in one piece; but the preferred construction is as shown and described herein. It will also be seen that by bracing the body of the wagon by the brace 5 it not only prevents "working" of the joints, but affords a very rigid support for the king-bolt, which is secured thereto.

The vertically-sliding movement of the reach connection on the pin 20 obviates what has heretofore constituted a strong objection to this class of wagons—viz., it provides means for maintaining unchanged the relative positions of the axle and said reach. With a rigid connection between the axle and a point opposite it on the drop-down portion A' of the wagon-body A whenever the spring on the axle supporting the forward end of said body would be considerably compressed the axle would be violently drawn in toward the drop-down portion A' of the said body and forced outward again when the spring rebounds to its normal position. This is due to the fact that the length of the reach is relatively much too short to permit much compression of the spring without causing a very considerable lateral movement to said axle, which tends to the rapid destruction of all connections thereof with the body of the wagon.

The construction shown and described herein obviates the said objections and provides a construction which while permitting free movements to the parts designed to move is nevertheless so constructed as to be thoroughly braced in every direction.

Having thus described my invention, what I claim, and desire to secure by Letters Patent, is—

1. Running-gear for the front axle of vehicles having drop-down bodies, comprising an axle, a segment-shaped plate secured to said axle, a reach located at right angles to said axle and extending therefrom toward said wagon-body, a vertical king-bolt supported on said body with which bolt said reach engages and on which it has vertical movements coinciding with the vertical movement of said axle, in combination with a spring located between said axle and the forward end of said wagon-body, a plate, a head-block to which said plate is secured in position to bear on said segmental plate secured to said axle, substantially as described.

2. In a vehicle having a drop-down body, running-gear for the front end thereof consisting of a spring, one side of which is secured to said body, a head-block to which the opposite side of said spring is secured, a plate on the under side of said head-block, a king-bolt supported in proximity to the end of the drop-down portion of said body, a brace extending from said head-block to said king-bolt, and having a sliding movement thereon, a spring between the upper end of said king-bolt and the top of said brace, combined with an axle, a segment-shaped plate secured thereto, a reach secured by one end to said axle and by its opposite end to said king-bolt on which it has a vertical sliding movement, and a hook on the plate secured to said head-block, for engaging the edge of said segment-shaped plate, substantially as described.

3. In a vehicle having a drop-down body, running-gear for the forward end thereof consisting of a king-bolt located on the end of said drop-down portion of said body, an axle, a segment-shaped plate secured to said axle, a reach extending between said axle and said king-bolt and engaging the latter, a head-block, a spring for supporting the forward end of said wagon-body, and interposed between said head-block and said body, a brace secured to and extending from said head-block to said king-bolt and sliding freely thereon, a plate on said head-block for bearing on said segmental-shaped plate and suitable braces from the ends of said segment-shaped plate to said axle, substantially as described.

JAMES J. CASEY.

Witnesses:
H. A. CHAPIN,
K. I. CLEMONS.